United States Patent Office 2,844,992
Patented July 29, 1958

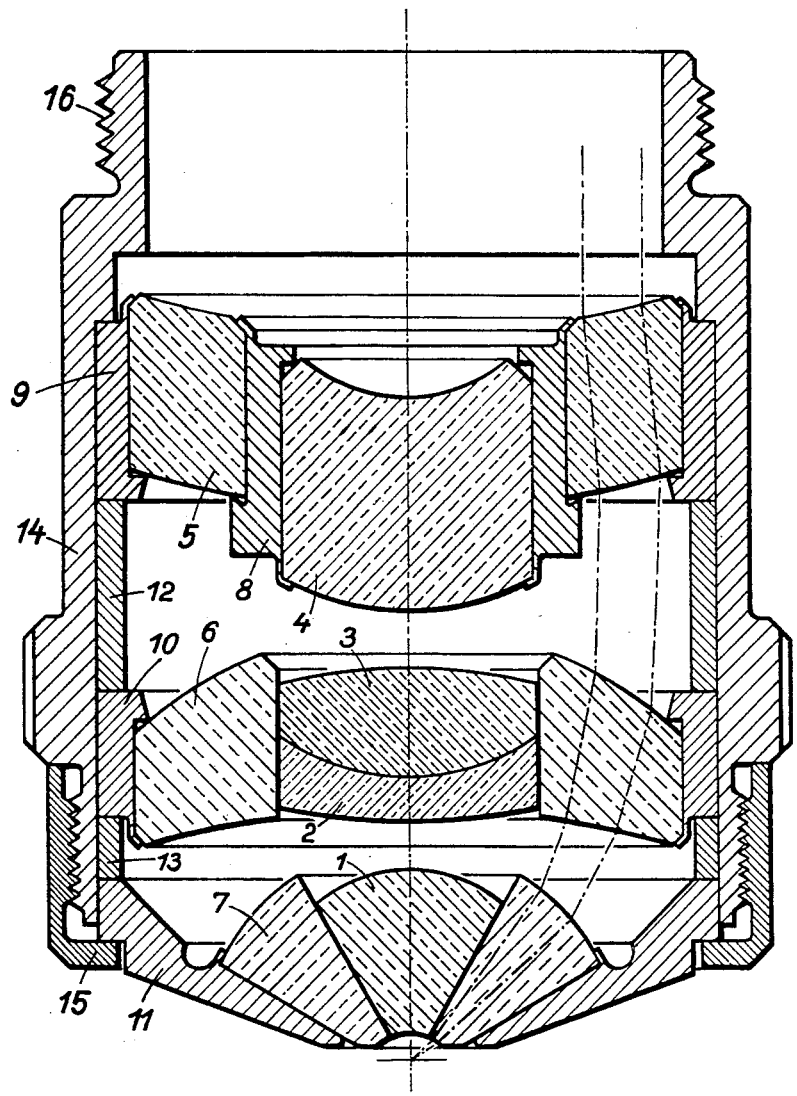

2,844,992

MICROSCOPE OBJECTIVES FOR EPI-MICROSCOPES

Eugen Bernhardt, Heidenheim (Brenz), Germany, assignor to Carl Zeiss, Heidenheim (Brenz), Wurttemberg, Germany Application June 14, 1954, Serial No. 436,345

Claims priority, application Germany June 13, 1953

2 Claims. (Cl. 88—39)

For epi-microscopes, objectives are customary which are equipped with a dark-field condenser consisting of ring-shaped structural elements. Lens condensers as well as reflecting condensers are employed. As a rule the mechanical construction of such a dark-field objective consists of two concentric mounting shells. The intermediate space between the two shells serves for the light entrance to the dark-field condenser. The inner mounting shell, whose diameter is kept as small as possible, serves for reception of the objective proper, the outer mounting shell for reception of the dark-field condenser. The mechanical joining of the two shells is usually executed in the form of three radial bridges or spokes which are so dimensioned that they in spite of adequate rigidity cut off the entrance of light to the dark-field condenser as little as possible. Nevertheless the three bridges cause a noticeable light loss and azimuth effects in the illumination, which can be disturbing with delicate objects.

It is customary to make the front lens mount of the objectives very pointed, in order to give the dark-field illumination the most unhindered access possible to the object. With objectives of low magnification there usually remains for the illumination, sufficient space beyond the front lens mount. With objectives of high magnification the space in front of the front lens is so greatly claimed by the aperture reach in imaging that space hardly remains available for the dark-field illumination, especially since the space requirement of the front lens mount can be considerable. The hitherto customary, highly magnifying microscope objectives for dark-field epi-illumination always have apertures which are essentially below those of normal objectives without dark-field part. The loss of aperture is due to the fact that in consideration of adequate dark-field illumination the free apertures of the objective front lenses must be reduced.

The development of microscope optics has led to the construction of objectives with flattened image field. The available fields of view of these objectives because of the flattening of the image field are essentially greater than those of objectives of the old type. In the same measure the object fields to be illuminated also become larger. Simultaneously therewith the difficulties increase in design of the dark-field condensers. The reason for this is that in objectives with flattened image field the free working distances regularly become shorter and the free diameters of the front lenses greater.

The invention concerns arrangements of the objective mount proper, which make it possible, in spite of the limitation of the space available for the dark-field condenser, to effect an adequate dark-field illumination, without cutting down the objective aperture.

The invention is relative to microscope objectives in which the lenses of the objective are cemented directly into the boring of the ring-shaped element of the dark-field condenser without interposition of a special mount. This procedure offers special advantages for mounting of the front lens. The front lens is centered off cone-shaped immediately along the course of the outermost aperture rays and cemented into a fitting cone-shaped boring of the condenser front lens. Thus it is possible to join the inner limiting aperture of the dark-field condenser to the limiting aperture of the objective and to provide powerful objectives with effective dark-field condensers without impairment of aperture. In order to prevent an undesired passage of light from the objective to the dark-field condenser and vice versa, a black-loaded cement is used.

With a further execution form of the microscope objective in accordance with the invention in which objective and condenser lens are cemented together, both lenses can receive at least one common optically effective surface of the same radius of curvature.

In the accompanying illustration is represented in section an execution example of the microscope objective in accordance with the invention. This contains four lenses of the objective proper 1, 2, 3 and 4 as well as three annular lenses 5, 6 and 7 of the dark-field condenser. The objective lens 4 is shown as being held, in a well known manner in a mount 8, which in turn is fastened in a cylindrical boring of the annular lens 5. The element of the objective consisting of lenses 2 and 3 cemented together is cemented to the annular lens 6 of the dark-field condenser in a cylindrical boring by means of a light-impervious cement. The front lens 1, according to the invention, possesses a conical outer boundary, which extends only a little beyond the course of the outermost aperture rays. The ring-shaped front lens 7 of the dark-field condenser receives a conical boring fitting the front lens cone. Objective and condenser front lens are cemented together with black-loaded cement. Both possess on the object side a common countersink with uniform radius of curvature. In the interior of this surface is located the free aperture of the objective front lens, which is surrounded by the ring-shaped zone of the condenser exit aperture.

The three elements of the dark-field condenser which each are united with an element of the objective, are arranged in mounts 9, 10, and 11 which are kept properly spaced by means of sleeves 12 and 13. The four mounts are inserted in an outer sleeve of the microscope objective 14 and held in position with a screw-cap ring 15. The outer sleeve 14 carries at its upper end the objective thread 16.

I claim:

1. Microscope objective lens system operated in common and fitted together with a ring-shaped dark-field illuminator for incident light in a common tubular body having means for attaching it to the lower end of the body tube of a microscope, said illuminator including at least one ring-shaped light condensing lens element having a central boring, at least one lens element of said microscope objective lens system being positioned in the central boring of said light condensing lens element to have its optical axis in coincidence with the optical axis of said light condensing lens element, the outer marginal portion of said microscope objective lens element having conical shape of identical angle of cone to receive said microscope lens element, the inner space between the boring wall of said light condensing lens element and the cylindrical outer marginal portion of said microscope objective lens system being filled with light-impervious cement.

2. In a microscope objective lens system operated in common and fitted together with a ring-shaped dark-field illuminator for incident light according to claim 1 said objective lens element and said light condensing lens element forming a cemented unit having at least one optically refractive surface in common with identical radius of curvature.

References Cited in the file of this patent

UNITED STATES PATENTS

| | | |
|---|---|---|
| 531,994 | Gathmann | Jan. 1, 1895 |
| 1,935,444 | Heine | Nov. 14, 1933 |
| 2,004,806 | Ellestad | June 11, 1935 |
| 2,025,893 | Polackoff | Dec. 31, 1935 |
| 2,133,585 | Spero | Oct. 18, 1938 |
| 2,357,378 | Benford | Sept. 5, 1944 |

FOREIGN PATENTS

| | | |
|---|---|---|
| 137,895 | Australia | June 11, 1934 |